United States Patent
Söderström

(10) Patent No.: US 9,430,772 B2
(45) Date of Patent: Aug. 30, 2016

(54) MOBILE CONTEXTUAL SMS ADVERTISING

(75) Inventor: Gustav Söderström, Bromma (SE)

(73) Assignee: Yahoo! Inc., Sunnyvale, CA (US)

( * ) Notice: Subject to any disclaimer, the term of this patent is extended or adjusted under 35 U.S.C. 154(b) by 1283 days.

(21) Appl. No.: 11/763,320

(22) Filed: Jun. 14, 2007

(65) Prior Publication Data

US 2008/0311934 A1  Dec. 18, 2008

(51) Int. Cl.
| | | |
|---|---|---|
| *H04W 4/00* | (2009.01) | |
| *G06Q 30/02* | (2012.01) | |
| *H04L 12/58* | (2006.01) | |
| *H04L 12/18* | (2006.01) | |

(52) U.S. Cl.
CPC .......... *G06Q 30/02* (2013.01); *H04L 12/5895* (2013.01); *H04L 51/38* (2013.01); *H04L 12/1859* (2013.01)

(58) Field of Classification Search
CPC .............. G06Q 30/02; H04L 12/5895; H04L 12/1859; H04L 51/38
USPC ...................... 455/466; 705/14.1; 725/37, 42
See application file for complete search history.

(56) References Cited

U.S. PATENT DOCUMENTS

| | | | |
|---|---|---|---|
| 5,493,692 | A | 2/1996 | Theimer et al. |
| 6,647,257 | B2 | 11/2003 | Owensby |
| 6,718,551 | B1 | 4/2004 | Swix et al. |
| 6,834,195 | B2 | 12/2004 | Brandenberg et al. |
| 2004/0068440 | A1* | 4/2004 | Porato ............................ 705/14 |
| 2005/0174975 | A1 | 8/2005 | Mgrdechian et al. |
| 2006/0085419 | A1 | 4/2006 | Rosen |
| 2006/0111895 | A1* | 5/2006 | Blaedow ......................... 704/10 |
| 2006/0161599 | A1 | 7/2006 | Rosen |
| 2006/0259473 | A1* | 11/2006 | Li et al. ............................ 707/3 |
| 2007/0072631 | A1* | 3/2007 | Mock et al. ................. 455/466 |
| 2007/0099636 | A1 | 5/2007 | Roth |
| 2007/0219794 | A1* | 9/2007 | Park et al. .................... 704/246 |
| 2007/0294725 | A1* | 12/2007 | Cohen et al. .................. 725/37 |
| 2008/0109735 | A1* | 5/2008 | Vuong .......................... 715/752 |

FOREIGN PATENT DOCUMENTS

| | | |
|---|---|---|
| GB | 2406996 | 4/2005 |
| WO | WO-0044151 | 7/2000 |

(Continued)

OTHER PUBLICATIONS

Federated search, http://en.wikipeda.org/wiki/Federated_search (last visited May 15, 2007) (3 pages).

(Continued)

*Primary Examiner* — Wayne Cai
(74) *Attorney, Agent, or Firm* — Greenberg Traurig LLP; James J. DeCarlo

(57) ABSTRACT

A mobile device, system, and method are directed towards employing a social SMS question and response interaction to identify and provide an advertisement to questioner, along with the response. In one embodiment, the questioner may register for discounts to the SMS server in return for receiving advertisements. As the questioner sends a question to another user, the question may be intercepted and a copy stored. When the other user provides a response to the question, the response may be intercepted and used to socially refine the question. The refined question may then be used to select a contextual advertisement sent with the response. In one embodiment, the questioner may receive a discount for receiving the contextual advertisement.

14 Claims, 4 Drawing Sheets

(56) References Cited

FOREIGN PATENT DOCUMENTS

| WO | WO-03015430 | 2/2003 |
|---|---|---|
| WO | WO-2005/069166 A1 | 7/2005 |
| WO | WO-2005/114970 A2 | 12/2005 |

OTHER PUBLICATIONS

Crowley, Dennis P. et al., U.S. Appl. 60/570,410, filed May 12, 2004 entitled "Location-Based Social Software for Mobile Devices", (18 pages).

Office Communication for Chinese Patent Application No. 200880020068.9 mailed Mar. 29, 2012.

Office Communication for Chinese Patent Application No. 200880020068.9 mailed Dec. 21, 2012.

Office Communication for Australia Patent Application No. 2008266286, mailed Jun. 29, 2011.

International Search Report and Written Opinion for International Patent Application No. PCT/US2008/066397, mailed Dec. 12, 2008.

International Preliminary Report on Patentability for International Patent Application No. PCT/US2008/066397, mailed Dec. 30, 2009.

Office Communication for Australia Patent Application No. 2008266286, mailed Oct. 11, 2010.

\* cited by examiner

MOBILE CONTEXTUAL SMS ADVERTISING

TECHNICAL FIELD

The present invention relates generally to mobile communications and, more particularly, but not exclusively to targeting advertisements to a mobile device based on an analysis of Short Message Service (SMS) request and replay messages.

BACKGROUND

Tremendous changes have been occurring in the Internet that influence our everyday lives. For example, mobile computing devices have become the vehicle to create new meeting grounds. They have been called the new power lunch tables and new golf courses for business life in the U.S. Moreover, many people are using such mobile computing device to reconnect themselves to their friends, their neighborhood, their community, and the world.

With this growth in the use of mobile computing devices has emerged a desire by many businesses to advertise to this group of computer users. However, advertisements that are merely sent to virtually any accessible mobile computing device would necessarily waste at least a portion of an advertiser's budget. To offset this unnecessary spending, advertisers continuously strive to narrow advertising efforts to a targeted audience.

On the Internet, a typical approach to selecting a target audience for an advertisement is based on a web site that a consumer visits, or a keyword entered into a search engine. However, waiting for a mobile user to perform such actions may result in missed opportunities for the advertiser and/or the consumer. Moreover, just as a search engine may misinterpret the intent of the searcher, so too may an inappropriate advertisement be displayed based on a misinterpretation of the search entry. Therefore, it is With respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
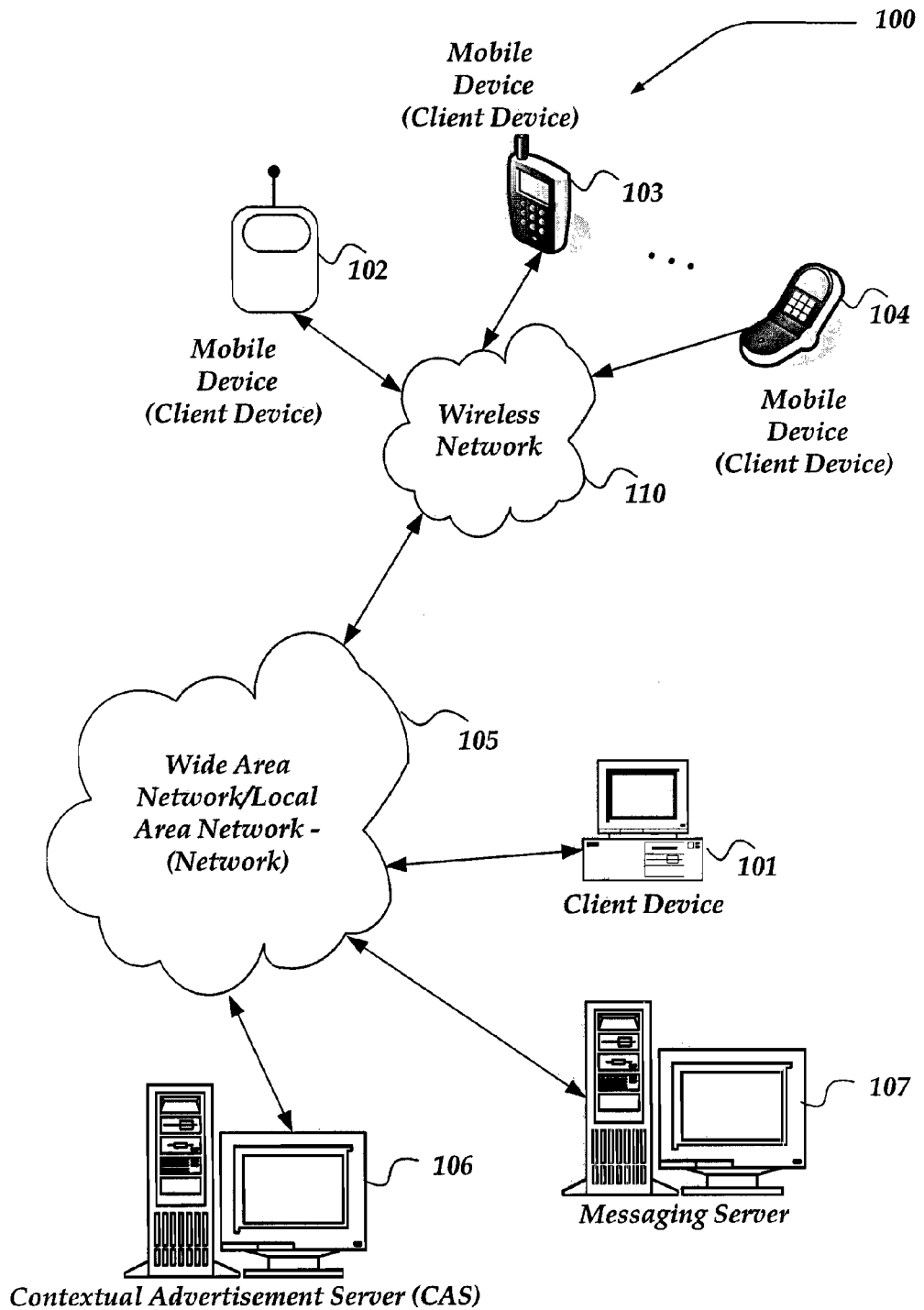
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

An advertisement, as used herein refers to any content that may be used to promote and/or educate the public. Often, the message is controlled by a sponsor of at least some of the content. Such content may be provided using any of a variety of mediums, including, but not limited to graphics, audio clips, video clips, text, or the like. In one embodiment, a URI, URL, or other link information may be provided to obtain access to the advertisement.

As used herein, the terms "text messaging," or "text message" refer to SMS messaging, as well as a variety of other limited size messaging protocols, including, but not limited to Instant Messaging (IM), Multimedia Messaging Service (MMS) message, or an Enhanced Message Service (EMS) messaging protocols.

Briefly stated the present invention is directed towards monitoring an interactive communication between mobile device users for a question and response. In one embodiment, the interactive communications is over SMS. However, the invention is not so limited, and other communication services may be used, including, IM, MMS, EMS, or the like. Messages between mobile device users may be intercepted and examined to determine if a question was transmitted. In one embodiment, a presence of a question mark, or other symbol, may be used to identify a question. In another embodiment, such question-oriented keywords as "what," "when," "how," "why," or "where," may also be employed to identify a presence of a question is an intercepted message. However, other more heuristic analysis of the intercepted message may also be used, without departing from the scope of the invention. In any event, when a question is transmitted, it may be tagged, and, in one embodiment, a copy may be saved. The original message may then be forwarded to the other user. When a response is received from the other user, the question and response may be jointly analyzed. Because the response may be seen as a human interpretation of the question, and the recipient is expected to provide a more social connection to the sender, the response may help to refine the intent of the querying user. The refined message and response may then be employed to select an advertisement directed towards, and more relevant or contextual to the communications. The contextual advertisement may then be sent with the response by way of a link, link information, or the like. In one embodiment, at least one of the mobile device users consents to receiving the contextual advertisement in return for some form of compensation, such as a discount in use of the messaging service.

Although many of the embodiments disclosed below are directed towards managing a contextual advertisement to a mobile device, the invention is not so constrained. Thus, the various embodiments may also manage the contextual advertisement on other types of computing devices, without departing from the scope of the invention.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")–(network) 105, wireless network 110, Contextual Advertisement Server (CAS) 106, mobile devices (client devices) 102-104, client device 101, and messaging server 107.

One embodiment of mobile devices 102-103 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, email, or the like, between another computing device, such as CAS 106, client device 101, each other, or the like. However, the present invention is not limited to these messaging protocols, and virtually any other messaging protocol may be employed.

Mobile devices 102-104 may be configured further to include a client application that enables the end-user to log into an end-user account that may be managed by another computing device, such as messaging server 107. Such end-user account, for example, may be configured to enable the end-user to receive emails, send/receive IM messages, SMS messages, access selected web pages, or the like. However, the invention is not constrained, and in one embodiment, the end-user might not need to log into an account to send/receive messages.

Moreover, in one embodiment, a user of at least one of mobile devices 102-104, may be enabled to register to receive compensation based on allowing CAS 106, messaging server 107, and/or the like, to send contextual advertisements based on monitoring of a message. For example, in one embodiment, a user of mobile devices 102-104, or even client device 101, may consent to receiving contextual advertisements in return for a cost reduction in use of one or more messaging services provided by messaging server 107. In one embodiment, the cost reduction may be based on a number of contextual advertisements the user receives, a number of contextual advertisements the user clicks on, or even based on providing consent to receive one or more contextual advertisements, or the like.

Mobile devices 102-104 may also communicate with non-mobile client devices, such as client device 101, or the like. In one embodiment, such communications may include sending and/or receiving messages, share photographs, audio clips, video clips, or any of a variety of other forms of communications.

Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102-104 and another computing device, network, and the like.

Network 105 is configured to couple messaging server 107, CAS 106, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between CAS 106, messaging server 107, client device 101, and/or other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of CAS 106 is described in more detail below in conjunction with FIG. 3. Briefly, however, CAS 106 may include any computing device capable of connecting to network 105 to analyze messages between communicating client devices, and to provide a contextual advertisement based on the message analysis. In one embodiment, the messages are text messages, using such as SMS, IM, MMS, EMS, or the like. However, the invention is not limited to text messages, and other types of messages, including, for example, audio messages, may be analyzed.

CAS 106 may, in one embodiment, receive messages between client devices that are intercepted by messaging server 107. CAS 106 may then determine whether the intercepted message includes a question. If the message includes a question, CAS 106 may then monitor for a response message. When the response message is received, it may be employed by CAS 106 to refine the question. For example, in one embodiment, at least one keyword within the response message may be combined with at least one keyword within the question. The combined keywords may then be used to perform a search within a data store. That is, the refined question may then be employed to search a data store to identify a contextual advertisement that may be sent along with the response. In one embodiment, the contextual advertisement may be sent via a link, such as a WAP link, a hyperlink, or even via link information indicating how to access the advertisement. For example, in one embodiment, the link information may include text instructions indicating how to access the contextual advertisement. In another embodiment, the link information may include a phone number to call to hear the contextual advertisement.

Devices that may operate as CAS 106 include personal computers desktop computers, multiprocessor systems, microprocessor-based or programmable consumer electronics, network PCs, servers, and the like.

Messaging server 107 includes virtually any computing device that is configured to provide one or more messaging services. For example, messaging server 107 may provide Instant Messaging (IM) services, email services, VOIP services, SMS services, or the like.

Messaging server 107 may be implemented on a variety of computing devices including personal computers, desktop computers, multiprocessor systems, microprocessor-based devices, network PCs, servers, network appliances, or the like. Moreover, although messaging server 107 is illustrated as a single network device, the invention is not so limited. For example, one or more of messaging servers may also be implemented using a plurality of network devices to provide the various messaging services.

In one embodiment, messaging server 107 may be configured to receive messages from a sending device, such as client devices 101-104, or the like, and provide the message, and/or a copy of the message to CAS 106 for analysis. Furthermore, messaging server 107 may similarly receive a link to a contextual advertisement, in one embodiment, from CAS 106, and provide the link or link information along with a response message to the original sending device. In another embodiment, messaging server 107 may forward the response message to CAS 106, and receive the response message, or a response message modified with the link information to the contextual message.

Moreover, although FIG. 1 illustrates CAS 106 as a single computing device, the invention is not so limited. For example, one or more functions of CAS 106 may be distributed across one or more distinct computing devices. Moreover, in one embodiment, messaging server 107 and CAS 106 may be integrated into a single computing device, without departing from the scope of the present invention, such as described below in conjunction with FIG. 3.

Illustrative Mobile Client Environment

Figure 2:
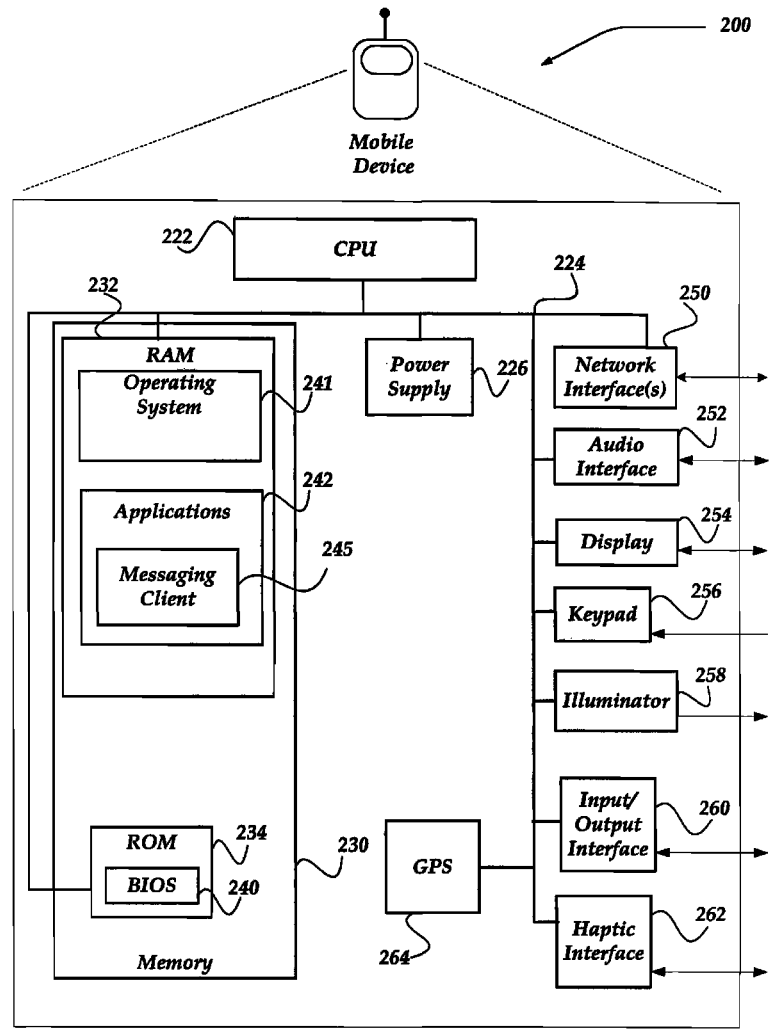
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, mobile devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data stores, which can be utilized by mobile device 200 to store, among other things, applications 242 and/or other data. For example, data stores may be employed to store information that describes various capabilities of mobile device 200. The information may then be provided to another device based on any of a variety of events, including being sent as part of a header during a communication, sent upon request, or the like. At least a portion of the capability information may also be stored on a disk drive or other storage medium (not shown) within mobile device 200.

Applications 242 may include computer executable instructions which, when executed by mobile device 200, transmit, receive, and/or otherwise process audio, video, and enable telecommunication with another user of another client device. Other examples of application programs include calendars, browsers, contact managers, task managers, transcoders, database programs, word processing programs, security applications, spreadsheet programs, games, search programs, and so forth. Applications 242 may further include messaging client 245 that is configured to send, to receive, and/or to otherwise process messages using SMS, MMS, IM, email, VOIP, and/or any of a variety of other messaging communication protocols. Although a single messaging client 245 is illustrated it should be clear that multiple messaging clients may be employed. For example, one messaging client may be configured to manage SMS messages, where another messaging client manages IM messages, and yet another messaging client is configured to manage emails, or the like.

Illustrative Server Environment

Figure 3:
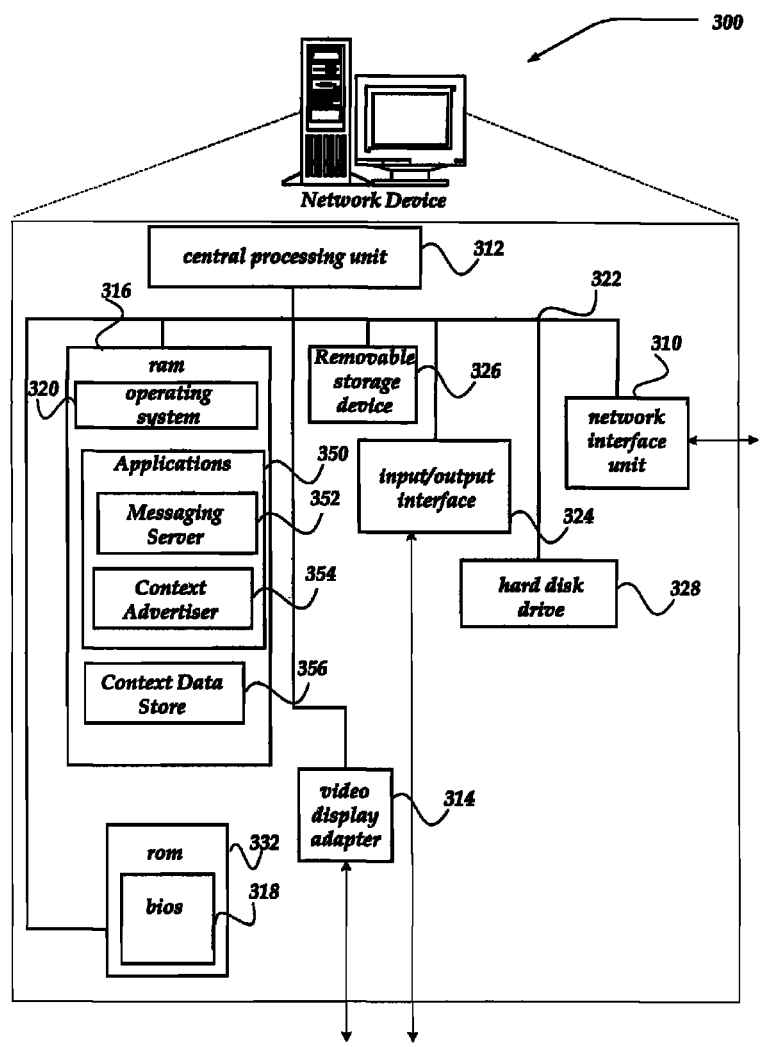
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, an integrated device for use in implementing CAS 106 and messaging server 107 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, and removable storage device 326 that may represent a tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, account management, and so forth. Messaging server 352 and context advertiser 354 may also be included as an application program within applications 350.

Messaging server 352 represents any of a variety of messaging services, including, but not limited to email server applications, IM server applications, SMS server applications, VOIP server applications, or the like. Moreover, although a single messaging server 352 is illustrated, the invention is not so limited, and network device 300 may include one or more messaging services, without departing from the scope or spirit of the invention.

Messaging server 352 is configured to manage messages between network devices, such as text messages, or the like. In one embodiment, messaging server 352 may charge a fee for use of its messaging services. In one embodiment, messaging services may also provide a cost reduction, discount, or a similar benefit to a user that consents to receiving advertisements, reading advertisements, and/or clicking on advertisements. In one embodiment, the advertisement may be selected by context advertiser 354.

Context Advertiser 354 is configured to receive a message from messaging server 352 that is destined for another computing device. Context Advertiser 354 may analyze the message to determine whether the message includes a question. Such determination may be based on a variety of criteria, including keywords, a symbol, such as a question mark, heuristics, or the like. For example, phrases, such as "can you," "do you," "whaz-up," or the like, may be determined to include questions.

When context advertiser 354 determines that a message includes a question, context advertiser 354 may then monitor for a response to the question. Such responses are expected to be from a human, likely to have some social connection with the sender of the question. Thus, the response may be used to refine an intent of the question sender, clarify the question, and potentially improve a value of the question.

Consider, for example, a question that asks "what's the way to the old cabin we were at last summer?" Such question may have little context to an automated search/analysis mechanism. However, with a response such as, "it's on A9 near Freemont," context advertiser 354 may select an advertisement associated with Freemont, maps for Freemont, or the like. Thus, the response may be seen as providing a social context to the question. Thus, context advertiser 354 may refine the intent of the question based on the response.

Context advertiser 354 may select a contextual advertisement based on analysis. In one embodiment, the selected contextual advertisement may be selected from stored advertisements and/or link information to advertisements stored in context data store 356. In one embodiment, at least some of the advertisements are sponsored advertisements. Context data store 356 may also be employed to store a copy of the message that includes the question, and/or information about the sender, including a sender address, name, account identifier, or the like. As such, context data store 356 may include a database, a folder, a spreadsheet, another application, or the like.

Generalized Operation

Figure 4:
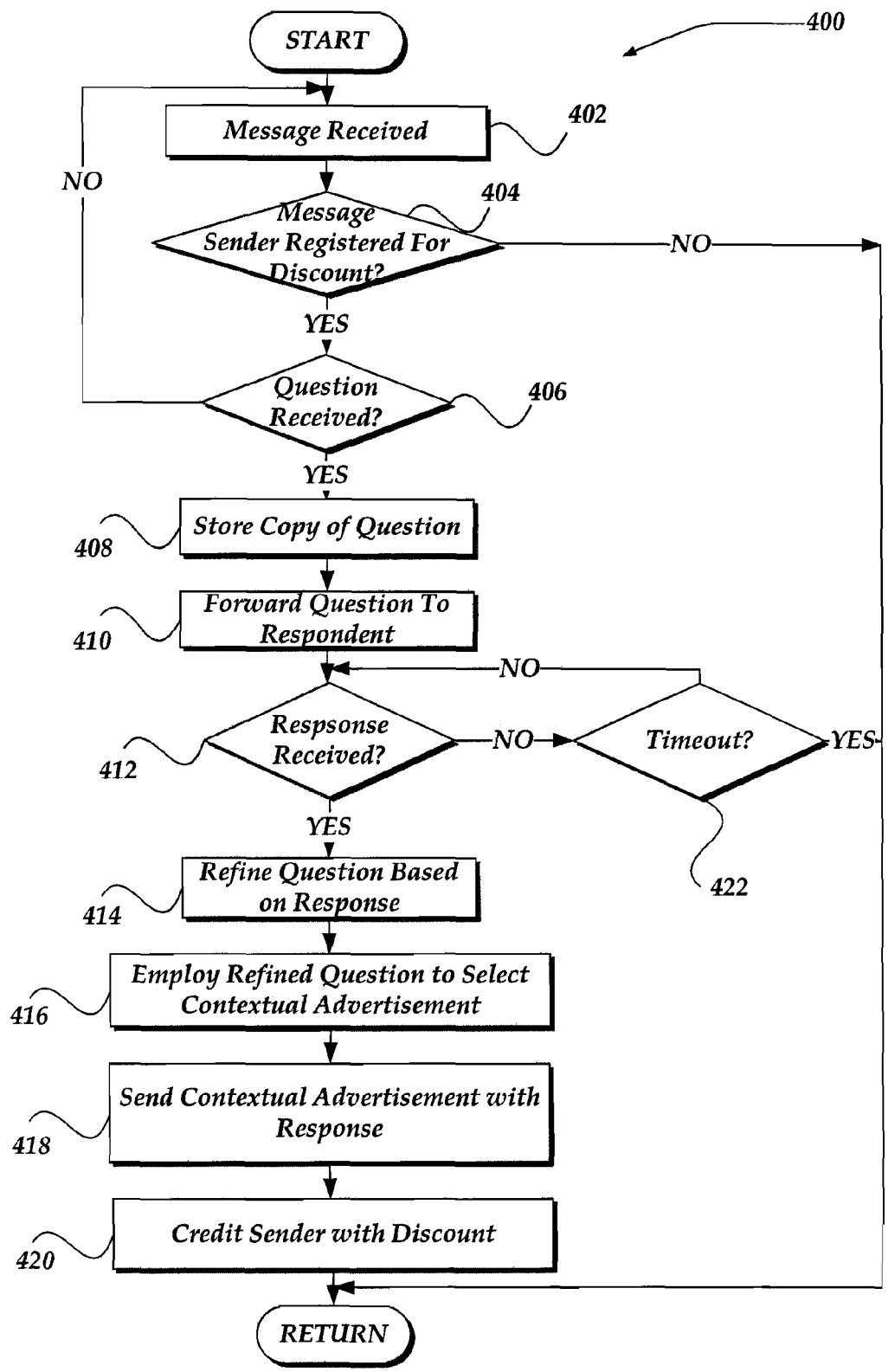
FIG. 4 illustrates a logical flow diagram generally showing one embodiment of a process for managing contextual advertisements based on text message interactions, in accordance with the present invention.

The operation of certain aspects of the invention will now be described with respect to FIGS. 4. FIG. 4 illustrates a logical flow diagram generally showing one embodiment of a process for managing contextual advertisements for text messages based on text message interactions. In one embodiment, the text messages are SMS messages, however, other messaging protocols may also be employed. In one embodiment, process 400 of FIG. 1 may be implemented within CAS 106 of FIG. 1, and/or network device 300 of FIG. 3.

Process 400 of FIG. 4 begins, after a start block, when a message is received. In one embodiment, the message is a text message. In one embodiment, the message is received from a mobile device, and is being sent to another mobile device. However, the invention is not so limited. For example, the communications may also be between a mobile device, and a non-mobile device, such as client device 101 of FIG. 1, of between two non-mobile devices.

Processing flows next to decision block 404 where a determination is made whether the message sender is registered to receive a discount for receiving contextual advertisements. If the message sender is unregistered to receive a discount processing may return to a calling process to perform other actions, in one embodiment. However, the invention is not so limited, and in another embodiment, a variety of other actions may be performed, including, for example, sending to the message sender an offer to receive a discount based, in part, on receiving advertisements, reading advertisements, or the like. In any event, as illustrated, in one embodiment, if the message sender is registered, processing proceeds to decision block 406.

At decision block 406, a determination is made whether the received message includes a question. As described above, a question may be identified based on a presence of a question mark within the received message, a presence of keywords, such as "what, where, when, why, how," or the like. Moreover, heuristics may also be employed to determine whether the received message includes a question. When it is determined that the received message includes a question, processing flows to block 408; otherwise, processing may loop back to block 402 to monitor for another message, that may include a question.

At block 408, a copy of the question may be stored. In one embodiment, an identifier associated with the sender and/or intended recipient of the message may also be stored. Processing continues to block 410, where the original message may then be forwarded towards the intended recipient.

Processing next flows to decision block 412 where a determination is made whether a response to the message is received. If so, processing flows to block 414; otherwise, processing flows to block 420, where a determination is made whether a timeout period is exceeded to wait for the response. The timeout period may be defined based on a variety of factors. For example, a timeout period of minutes may be selected to maintain relevancy between the question and a response. In any event, if the timeout period is exceeded, processing may return to the calling process to perform other actions. However, if the timeout period is not exceeded, processing may loop back to decision block 412, to monitor for receipt of the response.

At block 414, the response may then be used to refine the question. That is, a combination of the question and response may be generated that is useable to clarify, and/or narrow an interpretation of an intention of the question. For example, in one embodiment, at least one keyword may be obtained from within the response, and at least one keyword may be obtained from the question. These keywords may then be combined. In another embodiment, a refined question may be formed for use in a search, based on the response. Thus, in one embodiment, at least a portion of the answer may be used to modify the question. This refined question may then be used to perform a search for a contextual advertisement at block 416. Thus, selection of the contextual advertisement may be based on a search using keywords obtained from the refined question and/or response; a rephrased question based on a combination of the response with the question; or the like. In one embodiment, the contextual advertisement may also be a sponsored advertisement based on refined keywords, or the like.

Processing then flows to block 418, where a link to the contextual advertisement, link information indicating how to access the contextual advertisement, or the like, is inserted in, or otherwise associated with the response. The response and the link information or the like, is then provided to the original message sender—the user posing the question.

Processing then flows to block 420, where the original message sender may be credited with a discount, or other benefit, for allowing such contextual advertisements to be sent, reading of such advertisements, or based on a similar agreement. Processing then returns to the calling process to perform other actions.

It should be understood that while the above illustration describes text messaging, the invention is not so limited. For example, the messages may also be VOIP messages that may be analyzed using speech recognition tools, or the like. The contextual message may then be appended to the response using a variety of mechanisms, including, for example, by sending a phone number, a short audio message, or the like.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A non-transitory computer readable storage media embodying instructions which when executed cause a processor to perform the steps of:
   receiving a text message from a user of the mobile device that is directed towards another user of another computing device, the user and the other user having a social connection;
   examining the received text message to detect a question from the user to the other user;
   if a question from the user is detected in the received text message:
      storing a copy of the detected question comprised in the received message;
      monitoring for a response text message from the other user for a timeout time period;

employing the response text message to the detected question to refine the detected question from the user if the response text message is received within the timeout time period, refining the detected question from the user comprising rephrasing the detected question and clarifying the intent of the user;
employing the refined detected question to search for a contextual advertisement;
modifying the response text message to include link information to the contextual advertisement; and
providing the modified response text message to the user of the mobile device.

2. The non-transitory computer readable storage media of claim 1, wherein employing the response text message to refine the question further comprises: extracting at least one keyword from the response text message; modifying the question to include the at least one extracted keyword to generate the refined question.

3. The non-transitory computer readable storage media of claim 1, wherein examining the received text message to detect a question further comprises, searching the received text message for at least one of question mark, or a question-oriented keyword.

4. The non-transitory computer readable storage media of claim 1, wherein execution of the instructions enable further actions, including: providing compensation to the user of the mobile device based on at least one of receipt of the contextual advertisement, or selection of the contextual advertisement by the user.

5. The non-transitory computer readable storage media of claim 1, wherein the text message and the response text message employ Short Message Service (SMS).

6. A network device to manage a display of an advertisement at a mobile device, comprising:
a transceiver to send and receive data over the network; and
a processor;
a processor-readable storage medium comprising programming logic that comprises logic for:
receiving a text message from a user of the mobile device to another user of another computing device the user and the other user having a defined social connection;
examining the received text message to detect a question from the user to the other user;
if a question from the user is detected in the received text message:
storing a copy of the detected question comprised in the received text message;
monitoring for a response text message from the other user for a timeout time period;
refining the detected question from the user by combining at least a portion of the response text message to the detected question received from the other user with at least a portion of the detected question from the user, if the response text message is received within the timeout time period, refining the detected question from the user comprising rephrasing the detected question and clarifying the intent of the user;
employing the refined detected question to select a contextual advertisement;
modifying the response text message to include link information to the contextual advertisement; and
providing the modified response text message to the user of the mobile device.

7. The network device of claim 6, wherein programming logic for detecting a question comprises:
logic for analyzing the received text message for at least one of a defined symbol, or a question-oriented keyword.

8. The network device of claim 6, wherein programming logic for refining the detected question further comprises logic for:
selecting at least one keyword from the response text message;
selecting at least one keyword from the detected question; and
combining the at least one selected keyword from the response with the at least one selected keyword from detected question to refine the detected question.

9. The network device of claim 6, wherein the contextual advertisement further comprises a sponsored advertisement.

10. The network device of claim 6, wherein the link information further comprises at least one of a hyperlink, a phone number, or a text instruction indicating how to access the contextual advertisement.

11. A method comprising:
receiving, by a processor over a network, an Short Message Service (SMS) message from a user of the client device, the SMS message being directed to another user of another client device, the user and the other user having a defined social connection;
analyzing, by the processor, the SMS message to detect a question from the user to the other user;
if a question from the user is detected in the received text message:
storing, by the processor, a copy of the detected question comprised in the received text message;
monitoring, by the processor, for a response text message to the detected question from the other user for a timeout time period;
intercepting, by the processor, a response SMS from the other user of the other client device if the response text message is received within the timeout time period;
refining, by the processor, the detected question from the user by combining at least a portion of the response SMS message to the detected question with at least a portion of the detected question from the user, refining the detected question from the user comprising rephrasing the detected question and clarifying the intent of the user;
employing, by the processor, the refined detected question to select a contextual advertisement;
modifying, by the processor, the response SMS message to include link information to the contextual advertisement; and
providing, by the processor, the modified response SMS message to the mobile device.

12. The method of claim 11, wherein analyzing the SMS message further comprises:
analyzing, by the processor, the SMS message using heuristics to detect at least one of a question-oriented phrase, or question-oriented keyword.

13. The method of claim 11, wherein refining the detected question further comprises:
employing, by the processor, a social context of the response to modify the detected question.

14. The method of claim 11, the timeout time period is based on maintenance of relevancy between the detected question and a prospective response to the detected question.

* * * * *